July 29, 1930. M. MURUFAS 1,771,687
ADVERTISING DEVICE
Filed March 20, 1929

Inventor
M. Murufas
by Hazard and Miller
Attorneys

Patented July 29, 1930

1,771,687

UNITED STATES PATENT OFFICE

MENELAUS MURUFAS, OF LOS ANGELES, CALIFORNIA

ADVERTISING DEVICE

Application filed March 20, 1929. Serial No. 348,486.

This invention relates to advertising devices, and more especially to an advertising device adapted to be mounted within the spare tire carrier with which automobiles are conventionally equipped.

An object of the invention is the provision of a novel advertising device adapted to be mounted within such a tire carrier.

A more detailed object is the provision of an advertising device as described, comprising a curtain movably mounted within a housing, and provided with means for moving the curtain across an aperture through which a portion of the curtain is disposed, with the result that the wording or other advertising matter exposed to view, is continually changing. It is evident from this construction, that the advertising device of my invention, when mounted as above detailed, upon an automobile, will attract the maximum amount of attention, with the result that it constitutes an unusually efficient advertising medium.

A still further object is the provision of an advertising device as described, which is relatively inexpensive to manufacture, and which is very efficient and inexpensive to operate.

A further object is the provision of an advertising device adapted for installation and operation as described, and which is of such proportions that a materially greater area of curtain whereon the legend is marked, is visible at any one time, than in the case of advertising devices previously produced for similar usage.

The invention possesses other objects and advantageous features, some of which, with those enumerated, will be set forth in the following description of the invention's particular embodiment which is illustrated in the drawings accompanying and forming a part of the specification.

Referring to the drawings.

Figure 1:
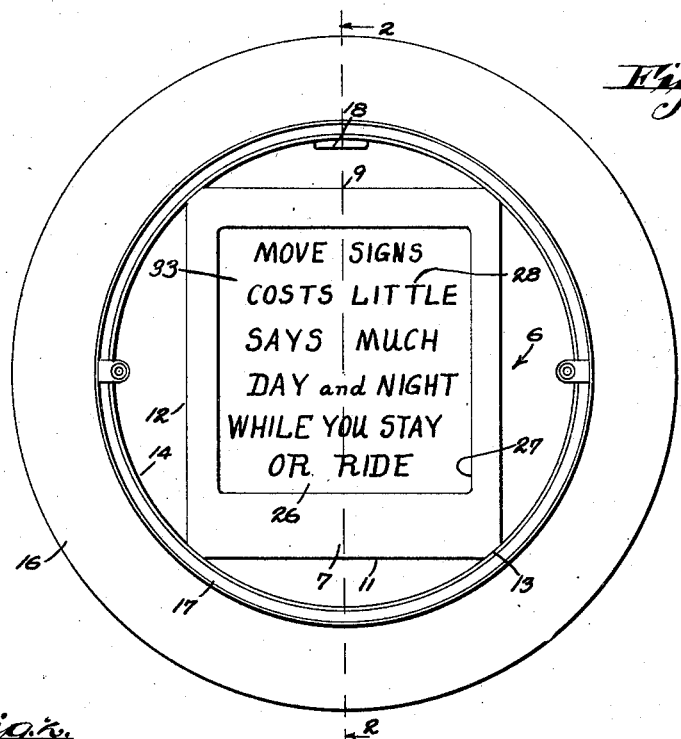
Figure 1 is an elevation of the advertising device of my invention, mounted within a spare tire carrier of an automobile. The direction of view is indicated by the arrow 2 of Fig. 1.
Figure 2:
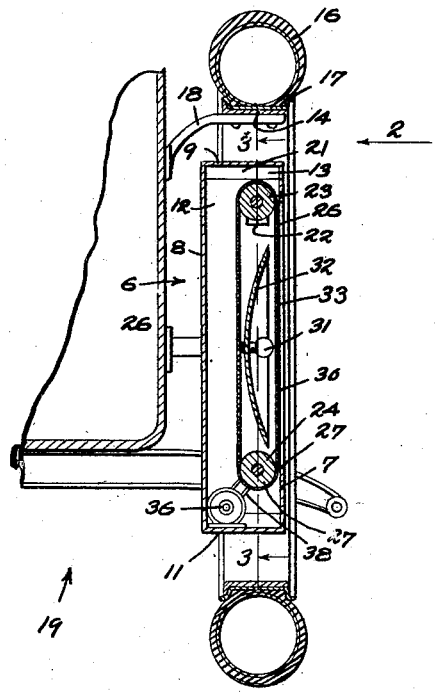
Fig. 2 is a vertical, medial sectional view taken upon the line 2—2 of Fig. 1, with the direction of view as indicated.
Figure 3:
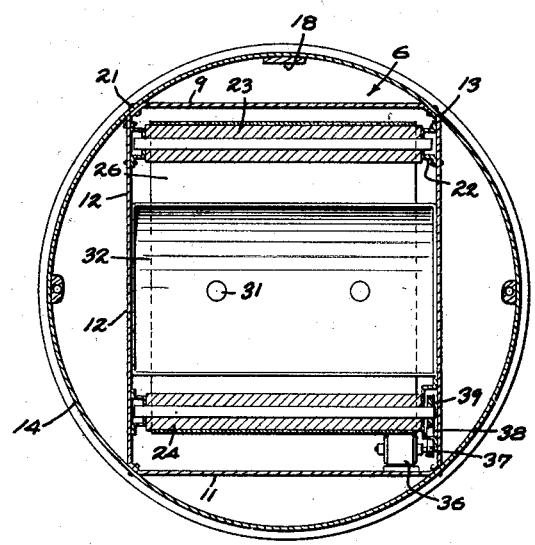
Fig. 3 is a vertical sectional view of the device and the tire rack, the tire and its rim being removed. The plane of section is taken upon the line 3—3 of Fig. 2, with the direction of view as indicated.

Specifically describing the invention in its preferred embodiment, it comprises a housing 6 made up of front and back walls 7 and 8, top and bottom walls 9 and 11, respectively, and opposed side walls 12. Preferably the corners of the housing 6, at the intersections of the sides 12 with the top and bottom 9 and 11, are beveled as at 13, to increase the area of contact of the housing 6, with the inner face of the circular rack 14 with which most vehicles are provided, this rack serving as a support for a spare tire 16 suitably mounted upon a rim 17. It will be understood that this spare tire rack 14 is mounted by suitable brackets 18, upon an automobile 19. Furthermore, the advertising device is capable of being employed in conjunction with spare tire racks 14, regardless of whether they are disposed upon the rear or side of the vehicle.

The housing 6 is so proportioned that it fits nicely within the spare tire rack 14; and any suitable fastening means such as rivets 21, extend through the beveled corners 13 and the adjacent portions of the spare tire rack 14, to securely and rigidly mount the advertising device inside the rack 14.

Two pair of opposed brackets 22 are secured to the side walls 12 closely adjacent the top 9 and bottom 11 respectively, and rollers 23 and 24 are journalled therein. A curtain 26 is carried by the rollers 23 and 24, a portion of this curtain being exposed to view through an aperture 27 which extends throughout the major portion of the area of the front wall 7. This curtain 26 is adapted to receive any suitable type of advertising matter such as lettering, figures, designs, or the like, and on account of the relatively large size of the aperture 27, a considerably extensive area of the curtain 26 and several lines of the legend carried thereby are visible at any one time therethrough. Preferably this advertising matter is formed by translucent areas 28 disposed in predetermined arrangement, to represent the desired characters, it being understood that the body of the curtain 26, is translucent. Furthermore, if the body of the curtain be of a different color from the translucent areas, the advertising device is adapted for day use as well as for use after dark.

A source of light such as a pair of electric light bulbs 31, are disposed within preferably a common reflector 32. This reflector is disposed behind the portion 33 of the curtain 26 which is exposed through the aperture 27 and is adapted to reflect light emanating from the bulbs 31, so as to increase the visibility of the translucent areas 28.

A small electric motor 36 is mounted within the housing, preferably upon the bottom 11; and its pulley 37 is connected by a belt 38, to a pulley 39 carried by the lower roller 24. Consequently, when the motor 36 is energized, the curtain 26 is continuously moved past the aperture 27, with the result that the exposed portion of the advertising matter carried thereby, is continually changing. Both the motor 36 and the bulb 31 may be energized from the same source of current which may conveniently be the storage battery of the automobile 19 upon which the advertising device is mounted.

The operation of the advertising device of the present invention, is believed obvious from the above description of its constituent parts. Energization of the motor 36 will effect rotation of the rollers 23 and 24, and consequent continuous moving of the curtain 26 past the aperture 27. Illumination of the bulbs 31 will increase the visibility of the translucent areas 28, particularly when the device is employed after dark. It is obvious that if a device of this nature is mounted upon such a vehicle as an automobile, that it will attract a large amount of attention, with the result that it constitutes an unusually efficient type of advertising medium. Furthermore, it is relatively inexpensive to manufacture and operate.

Owing to the relatively large area 33 of the curtain, which is exposed to view, an observer is enabled to read several lines of the advertising legend. This, of course, facilitates understanding whatever intelligence the legend is intended to convey, inasmuch as it is easier for a reader to understand written language, and follow the continuity thereof if he can observe several words at one time, than if he can observe only a series of single words presented successively to him.

It is to be understood that the details of the invention as herein disclosed, are subject to alteration within the spirit or scope of the appended claim.

I claim:

An advertising device for tire carriers, comprising a housing proportioned to be received within a carrier and occupy the major portion of the space enclosed thereby, the corners of said housing being beveled, attaching means extending through each of said beveled corners and engageable with said rim, rollers journalled within the housing closely adjacent opposite walls thereof, a curtain having a legend thereon and mounted on said rollers, a portion of said curtain being visible through an aperture extending throughout the major portion of the area of another wall of the housing, and means for rotating said rollers.

In testimony whereof I have signed my name to this specification.

MENELAUS MURUFAS.